(12) United States Patent
Sengupta et al.

(10) Patent No.: US 11,665,711 B2
(45) Date of Patent: May 30, 2023

(54) DECODING PHYSICAL MULTICAST CHANNEL SUBFRAMES ACCORDING TO DIFFERENT REFERENCE SIGNAL PATTERNS

(71) Applicant: QUALCOMM Incorporated, San Diego, CA (US)

(72) Inventors: Ayan Sengupta, San Diego, CA (US); Amer Catovic, Carlsbad, CA (US); Alberto Rico Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 39 days.

(21) Appl. No.: 17/035,124

(22) Filed: Sep. 28, 2020

(65) Prior Publication Data
US 2021/0105742 A1    Apr. 8, 2021

Related U.S. Application Data

(60) Provisional application No. 62/910,759, filed on Oct. 4, 2019.

(51) Int. Cl.
| | |
|---|---|
| *H04W 72/00* | (2023.01) |
| *H04W 72/04* | (2023.01) |
| *H04L 5/00* | (2006.01) |
| *H04L 5/02* | (2006.01) |
| *H04W 72/044* | (2023.01) |

(52) U.S. Cl.
CPC ......... *H04W 72/005* (2013.01); *H04L 5/0023* (2013.01); *H04L 5/023* (2013.01); *H04W 72/042* (2013.01); *H04W 72/044* (2013.01)

(58) Field of Classification Search
CPC ............. H04W 72/005; H04W 72/042; H04W 72/044; H04L 5/023; H04L 5/0023
See application file for complete search history.

(56) References Cited

U.S. PATENT DOCUMENTS

| | | | |
|---|---|---|---|
| 8,582,488 B2 * | 11/2013 | Xu ...................... | H04W 72/005 370/312 |
| 9,271,272 B2 * | 2/2016 | Awad .................. | H04W 72/042 |
| 9,699,764 B2 * | 7/2017 | Wang ................... | H04W 24/00 |

(Continued)

OTHER PUBLICATIONS

International Search Report and Written Opinion—PCT/US2020/053341—ISA/EPO—dated Nov. 30, 2020.

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a user equipment (UE) may receive a multicast channel configuration that indicates a set of multicast channel time domain resources allocated to a multicast channel for a first multicast broadcast area. The UE may receive an indication of a first set of time domain resources, of the set of multicast channel time domain resources, that have a first reference signal pattern that differs in frequency domain density as compared to a second reference signal pattern used for at least one of a second set of time domain resources of the set of multicast channel time domain resources or a second multicast broadcast area. The UE may decode the first set of time domain resources based at least in part on the first reference signal pattern. Numerous other aspects are provided.

30 Claims, 8 Drawing Sheets

(56) References Cited

U.S. PATENT DOCUMENTS

| | | | | |
|---|---|---|---|---|
| 2011/0243056 | A1* | 10/2011 | Jen | H04L 5/0051 |
| | | | | 370/312 |
| 2015/0215085 | A1* | 7/2015 | Xu | H04L 12/189 |
| | | | | 370/312 |
| 2015/0288483 | A1* | 10/2015 | Sun | H04L 1/0017 |
| | | | | 370/329 |
| 2015/0373694 | A1* | 12/2015 | You | H04W 24/08 |
| | | | | 370/329 |
| 2017/0006578 | A1* | 1/2017 | Rico Alvarino | H04L 5/0048 |
| 2017/0325260 | A1* | 11/2017 | Guo | H04L 5/0092 |
| 2018/0092106 | A1* | 3/2018 | Rico Alvarino | H04W 72/1205 |
| 2018/0234112 | A1* | 8/2018 | Eckardt | H03M 13/09 |
| 2018/0270032 | A1* | 9/2018 | Li | H04L 5/0048 |
| 2018/0324732 | A1* | 11/2018 | Park | H04W 72/12 |
| 2019/0097782 | A1* | 3/2019 | Horiuchi | H04L 27/2646 |
| 2019/0334749 | A1* | 10/2019 | Tang | H04L 5/0078 |
| 2019/0363848 | A1* | 11/2019 | Sun | H04L 27/2602 |

* cited by examiner

| SFN | SFN #0(CAS) | SFN #1 | SFN #2 | SFN #3 | SFN #4 | SFN #5 | SFN #6 | SFN #7 | SFN #8 | SFN #9 | SFN #10 | SFN #11 | SFN #12 | SFN #13 |
|---|---|---|---|---|---|---|---|---|---|---|---|---|---|---|
| 0 | | MSI | MTCH | MTCH | MSI | MTCH | MTCH | MTCH | MTCH | MTCH | MTCH | MTCH | MTCH | MTCH |
| 1 | | | MTCH | MTCH | MTCH | MTCH | MTCH | MTCH | MTCH | MTCH | MTCH | MTCH | MTCH | MTCH |
| 2 | | | MTCH | MTCH | MTCH | MTCH | MTCH | MTCH | MTCH | MTCH | MTCH | MTCH | MTCH | MTCH |
| 3 | | | MCCH | MTCH | MTCH | MTCH | MCCH | MTCH | MTCH | MTCH | MTCH | MTCH | MTCH | MTCH |
| 4 | | | | MTCH | MTCH | MTCH | MTCH | MTCH | MTCH | MTCH | MTCH | MTCH | MTCH | MTCH |
| ... | | | | | | | | | | | | | | |
| 9 | | | MCCH | MTCH | MTCH | MTCH | MTCH | MTCH | MTCH | | | | | |
| 10 | | | MCCH | MTCH | MTCH | MTCH | MTCH | MTCH | MTCH | | | | | |
| 11 | | | MTCH | MTCH | MTCH | MTCH | MCCH | MTCH | MTCH | | | | | |
| 12 | | | MTCH | MTCH | MTCH | MTCH | MTCH | MTCH | MTCH | | | | | |
| ... | | | | | | | | | | | | | | |
| 17 | | | | | | | MSI | | | | | | | |
| 18 | | | | | | | | | | | | | | |
| 19 | | | | | | | | | | | | | | |
| 20 | | | | | | | MCCH | | | | | | | |
| ... | | | | | | | | | | | | | | |
| 25 | | | | | | | | | | | | | | |
| 26 | | | | | | | MSI | | | | | | | |

```
MBSFN-Area 1
  mcch-Config
  mcch-RepetitionPeriod rf16
  radioFrameAllocationOffset4 100000
  sf-allocinfo 100000
  rs-decodableInfo 1000000         605
  MBSFN-SubframeConfig (MCCH)
  radioFrameAllocationPeriod n8
  subframeAllocation-v1430fourFrame 111000 x 4      SF 1-3, 6-8
  subframeAllocation-v1430fourFrame 10 x 4          SF 4, 9
  subframeAllocation-v16fourFrame 01111 x 4         SF 5, 10-13 (TBD)
  rs-decodableInfo 10000000001000                    610
  pmch-Config (MCCH)
  mch-SchedulingPeriod rf16
```

```
MBSFN-Area 2
  mcch-Config
  mcch-RepetitionPeriod rf8
  radioFrameAllocationOffset01    615
  sf-allocinfo 001000
  rs-decodableInfo 000100
  MBSFN-SubframeConfig (MCCH)
  radioFrameAllocationPeriod n8
  radioFrameAllocationOffset 1
  subframeAllocationfourFrame 000111 x 4            SF 1-3, 6-8
  subframeAllocation-v1430fourFrame 01 x 4          SF 4, 9
  subframeAllocation-v16fourFrame 10000 x 4         SF 5, 10-13 (TBD)
  rs-decodableInfo 0000100000000                     620
  pmch-Config (MCCH)
  mch-SchedulingPeriod rf16
```

FIGURE 6

DECODING PHYSICAL MULTICAST CHANNEL SUBFRAMES ACCORDING TO DIFFERENT REFERENCE SIGNAL PATTERNS

CROSS-REFERENCE TO RELATED APPLICATION

This Patent Application claims priority to U.S. Provisional Patent Application No. 62/910,759, filed on Oct. 4, 2019, entitled "DECODING PHYSICAL MULTICAST CHANNEL SUBFRAMES ACCORDING TO DIFFERENT REFERENCE SIGNAL PATTERNS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for decoding physical multicast channel subframes according to different reference signal patterns.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

If a base station is associated with multiple multicast broadcast single frequency networks (MBSFNs), those MBSFNs may be carried on different physical channels (having different channel characteristics or different numerologies, among other examples) and may be time-division multiplexed. In such examples, reference signals from a first MBSFN may not be used to perform channel estimation for a second MBSFN due to the different physical channels. Furthermore, due to time-division multiplexing, a physical multicast channel (PMCH) subframe of a first MBSFN may not be immediately preceded by a PMCH subframe from the same MBSFN subframe. In such examples, if a UE is configured with a reference signal pattern that spans multiple symbols, the UE may need to buffer reference signals, leading to excessive memory usage and increased latency.

SUMMARY

In some aspects, a method of wireless communication performed by a user equipment (UE) includes receiving a multicast channel configuration that indicates a set of multicast channel time domain resources allocated to a multicast channel for a first multicast broadcast area. The method may include receiving an indication of a first set of time domain resources, of the set of multicast channel time domain resources, that have a first reference signal pattern. The first reference signal pattern may differ in frequency domain density as compared to a second reference signal pattern used for at least one of a second set of time domain resources of the set of multicast channel time domain resources or a second multicast broadcast area. The method may include decoding the first set of time domain resources based at least in part on the first reference signal pattern.

In some aspects, a UE for wireless communication includes a memory and one or more processors operatively coupled to the memory. The memory and the one or more processors may be configured to receive a multicast channel configuration that indicates a set of multicast channel time domain resources allocated to a multicast channel for a first multicast broadcast area. The memory and the one or more processors may be configured to receive an indication of a first set of time domain resources, of the set of multicast channel time domain resources, that have a first reference signal pattern. The first reference signal pattern may differ in frequency domain density as compared to a second reference signal pattern used for at least one of a second set of time domain resources of the set of multicast channel time domain resources or a second multicast broadcast area. The memory and the one or more processors may be configured to decode the first set of time domain resources based at least in part on the first reference signal pattern.

In some aspects, a non-transitory computer-readable medium storing a set of instructions for wireless communication includes one or more instructions that, when executed by one or more processors of a UE, cause the UE to: receive a multicast channel configuration that indicates a set of multicast channel time domain resources allocated to a multicast channel for a first multicast broadcast area. The one or more instructions may cause the UE to receive an indication of a first set of time domain resources, of the set of multicast channel time domain resources, that have a first reference signal pattern. The first reference signal pattern may differ in frequency domain density as compared to a second reference signal pattern used for at least one of: a second set of time domain resources of the set of multicast channel time domain resources, or a second multicast broadcast area. The one or more instructions may cause the UE to decode the first set of time domain resources based at least in part on the first reference signal pattern.

In some aspects, an apparatus for wireless communication includes means for receiving a multicast channel configuration that indicates a set of multicast channel time domain resources allocated to a multicast channel for a first multicast broadcast area. The apparatus may include means for receiving an indication of a first set of time domain resources, of the set of multicast channel time domain resources, that have a first reference signal pattern. The first reference signal pattern may differ in frequency domain density as compared to a second reference signal pattern used for at least one of: a second set of time domain resources of the set of multicast channel time domain resources, or a second multicast broadcast area. The apparatus may include means for decoding the first set of time domain resources based at least in part on the first reference signal pattern.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a diagram illustrating an example of decoding physical multicast channel subframes according to different reference signal patterns in accordance with various aspects of the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

If a base station is associated with multiple multicast broadcast single frequency networks (MBSFNs), those MBSFNs may be carried on different physical channels (having different channel characteristics or different numerologies, among other examples) and may be time-division multiplexed. In such examples, reference signals from a first MBSFN may not be used to perform channel estimation for a second MBSFN due to the different physical channels. Furthermore, due to time-division multiplexing, a physical multicast channel (PMCH) subframe of a first MBSFN may not be immediately preceded by a PMCH subframe from the same MBSFN subframe. In such examples, if a user equipment (UE) is configured with a reference signal (RS) pattern that spans multiple symbols, the UE may need to buffer reference signals, leading to excessive memory usage and increased latency. Some techniques and apparatuses described herein enable the indication of different frequency domain RS patterns for different PMCH subframes. Using such an indication, RS patterns may be designed to reduce latency and buffering delays.

Figure 1:
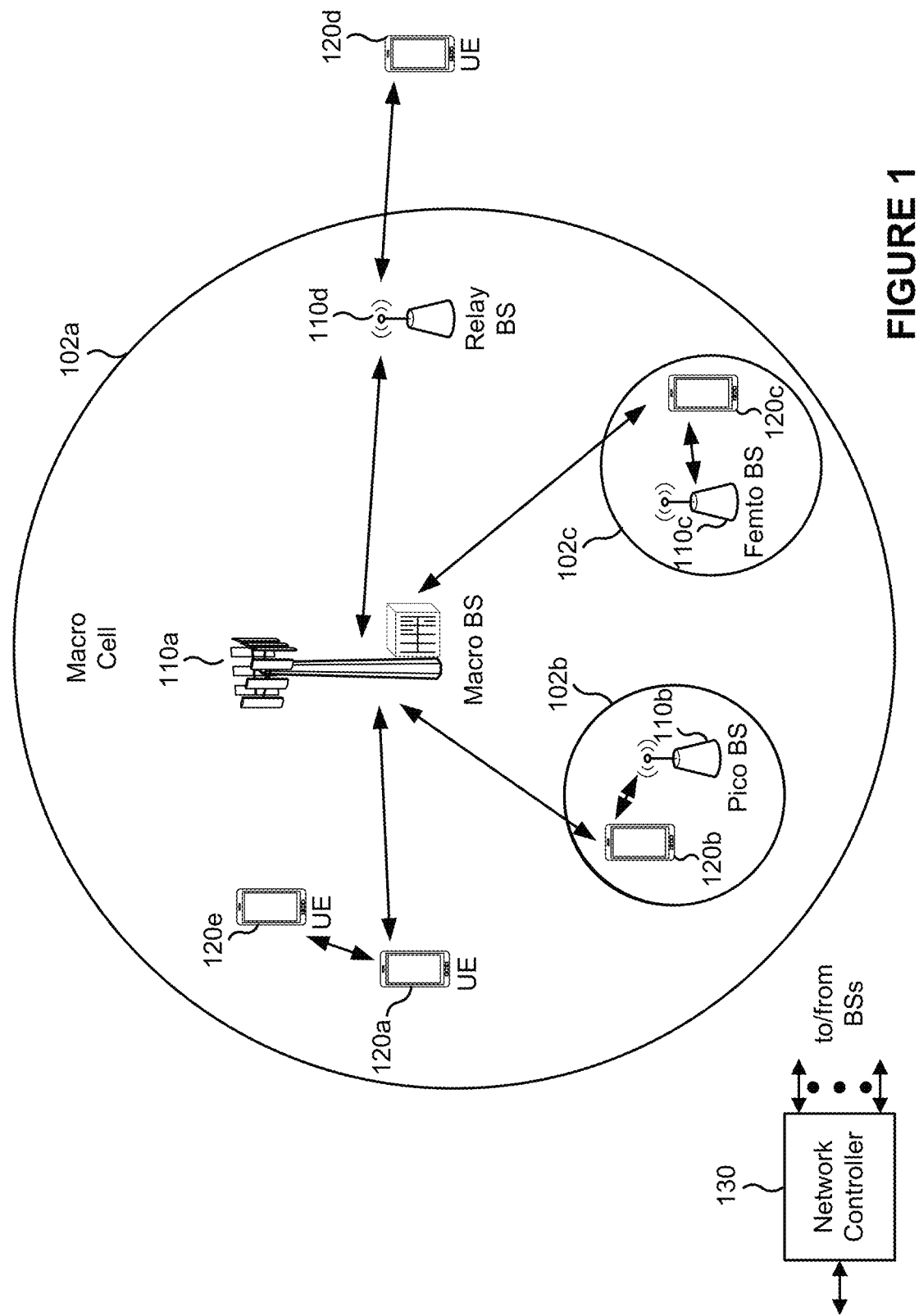
FIG. 1 is a diagram illustrating an example wireless network in accordance with various aspects of the present disclosure.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, or the like, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In such examples, the UE 120 may perform scheduling operations, resource selection operations, or other operations described elsewhere herein as being performed by the base station 110.

Figure 2:
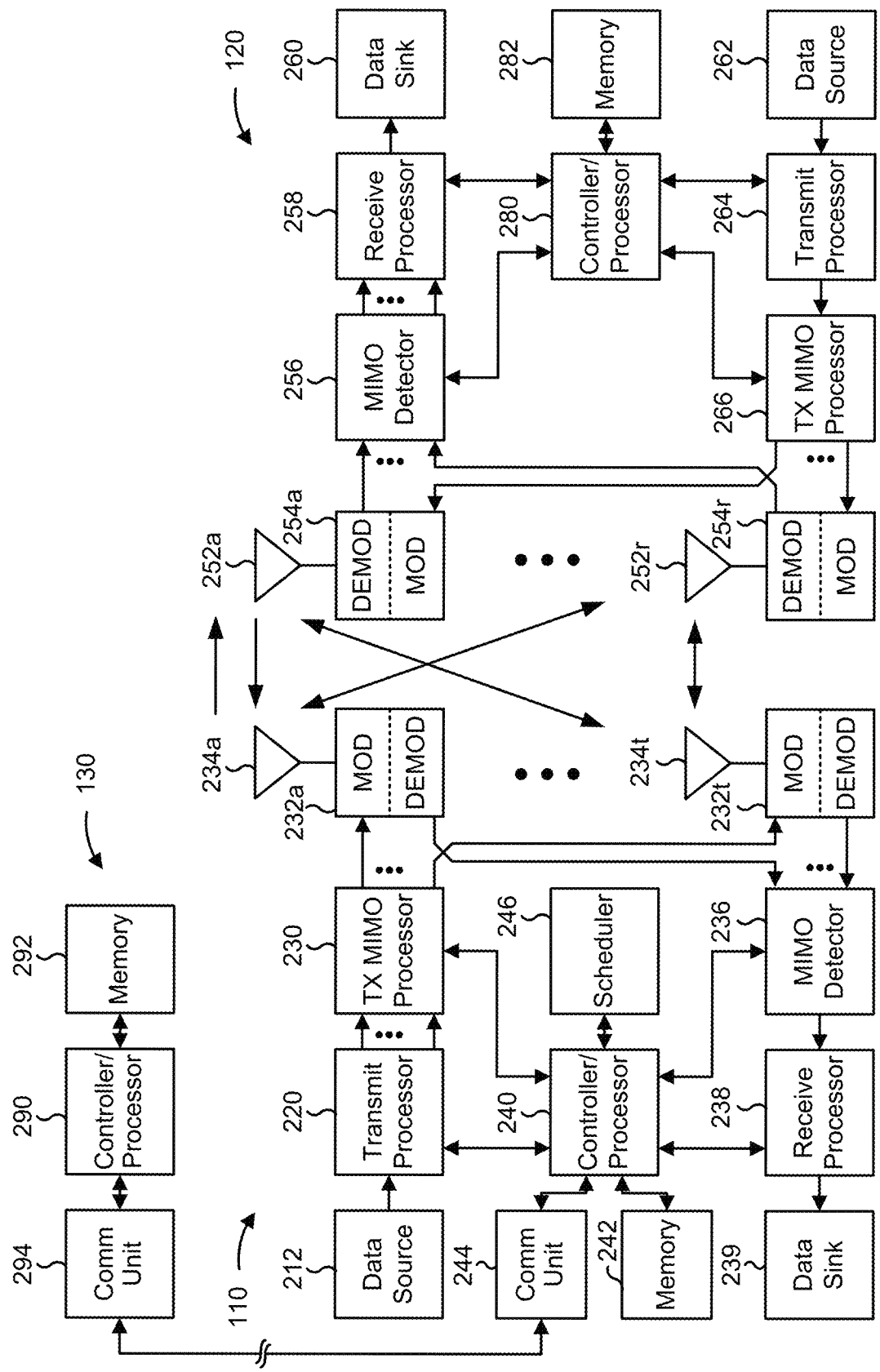
FIG. 2 is a diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with decoding physical multicast channel subframes according to different reference signal patterns, as described in more detail elsewhere herein. For example, controller/processor 240 of base station 110, controller/processor 280 of UE 120, or any other component(s) of FIG. 2 may perform or direct operations of, for example, the process of FIG. 7 or other processes as described herein. Memories 242 and 282 may store data and program codes for base station 110 and UE 120, respectively. A scheduler 246 may schedule UEs for data transmission on the downlink or uplink.

In some aspects, the UE includes means for receiving a multicast channel configuration that indicates a set of multicast channel time domain resources allocated to a multicast channel for a first multicast broadcast area; means for receiving an indication of a first set of time domain resources, of the set of multicast channel time domain resources, that have a first reference signal pattern that differs in frequency domain density as compared to a second reference signal pattern used for at least one of: a second set of time domain resources of the set of multicast channel time domain resources, or a second multicast broadcast area; or means for decoding the first set of time domain resources based at least in part on the first reference signal pattern. In some aspects, the UE includes means for decoding the second set of time domain resources based at least in part on the second reference signal pattern. In some aspects, the UE includes means for performing channel estimation for a time domain resource, of the second set of time domain resources, using a set of reference signals included in multiple time domain resources.

In some aspects, the UE includes means for receiving, via the MCCH, a multicast traffic channel (MTCH) configuration that indicates a second set of multicast channel time domain resources allocated to an MTCH or for multicast scheduling information (MSI) for the multicast broadcast area; means for receiving, via the MCCH, an indication of a first set of MTCH or MSI time domain resources, of the second set of multicast channel time domain resources, that have a denser frequency domain reference signal pattern than at least one of a second set of MTCH or MSI time domain resources, of the second set of multicast channel time domain resources, or the second multicast broadcast area; or means for decoding the first set of MTCH or MSI time domain resources based at least in part on the denser reference signal pattern.

The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

Figure 3:
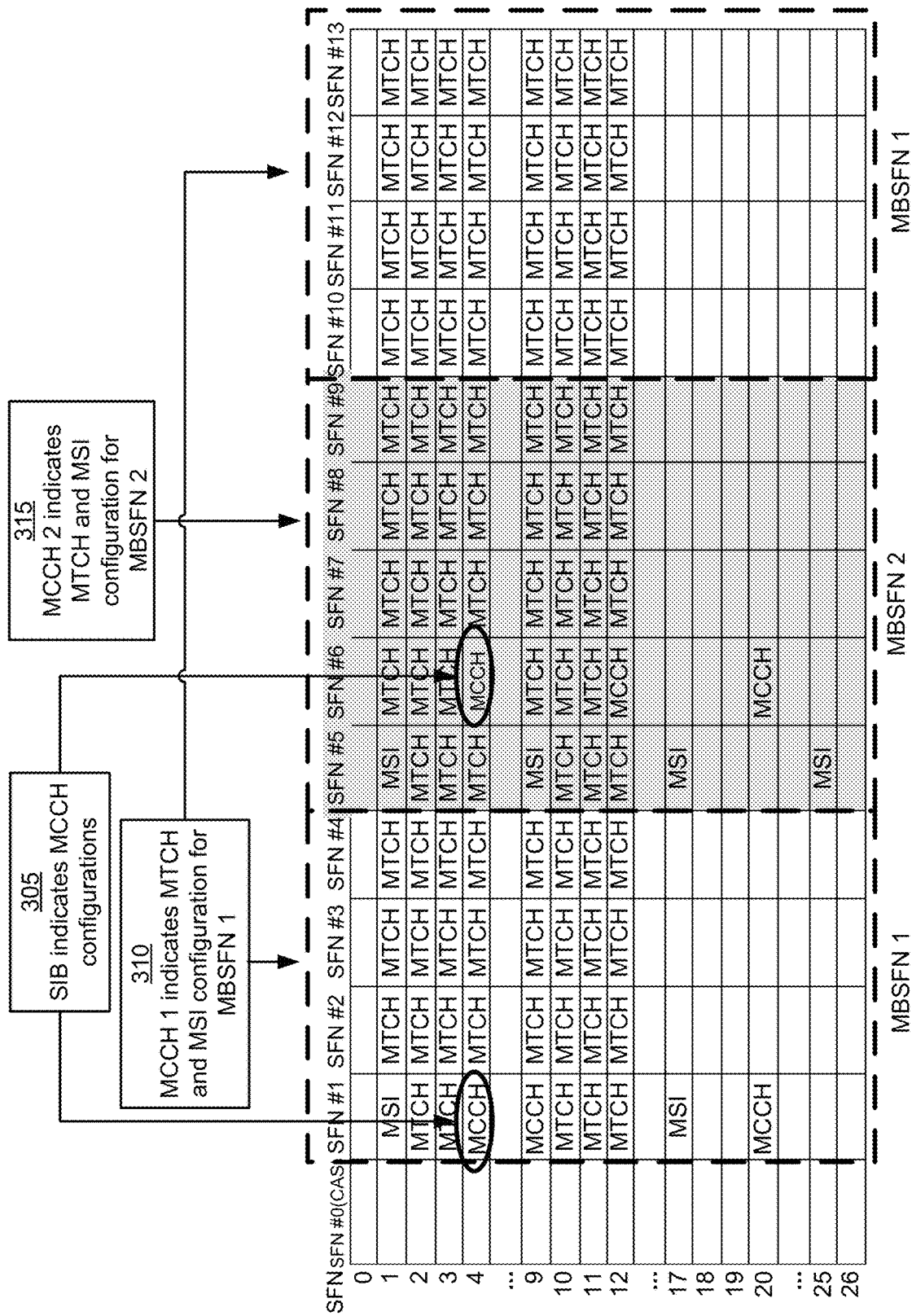
FIG. 3 is a diagram illustrating an example of multicast channel configuration in accordance with various aspects of the present disclosure.

FIG. 3 is a diagram illustrating an example of multicast channel configuration in accordance with various aspects of the present disclosure.

In a first operation 305, a base station 110 may transmit a system information block (SIB) that includes a configuration for a multicast control channel (MCCH) for a multicast broadcast multimedia service (MBMS). A UE 120 may receive the SIB, and may decode the SIB to obtain an MCCH configuration. The MCCH configuration may indicate, for example, subframes allocated to the MCCH on a physical multicast channel (PMCH). Additionally or alternatively, the MCCH configuration may indicate a numerology for the MCCH or other information for the MCCH. As shown, in some aspects, the base station 110 may belong to multiple multicast broadcast single frequency networks (MBSFNs). In such examples, the SIB may include separate MCCH configurations for different MBSFNs. In FIG. 3, the SIB includes a first MCCH configuration for a first MBSFN (shown as MBSFN 1) and a second MCCH configuration for a second MBSFN (shown as MBSFN 2). As shown, multiple MBSFNs may be time-division multiplexed across the resources allocated for all MBSFN communications. Although this disclosure uses the term "MBSFN area" to refer to a specific type of multicast broadcast area, the techniques described herein can apply generally to any multicast broadcast area. Thus, the term "MBSFN area," when used herein, may be replaced with the term "multicast broadcast area."

In a second operation 310, the base station 110 may transmit a first MCCH communication (MCCH 1) of the first MBSFN on an MCCH subframe indicated in the SIB. In FIG. 3, this MCCH subframe is shown as subframe (SF) #1 on system frame number (SFN) 4 (or frame 4). The UE 120 may receive and decode the first MCCH communication. The first MCCH communication may include a first configuration for a multicast traffic channel (MTCH) or for multicast scheduling information (MSI). The MTCH may carry multicast or broadcast data for MBSFN 1, and the MSI may include medium access control (MAC) layer scheduling information associated with the MTCH on MBSFN 1. The first MTCH/MSI configuration may indicate, for example, subframes allocated to the MTCH on the PMCH for MBSFN 1 or subframes allocated to MSI on the PMCH for MBSFN 1. The first MTCH/MSI communication may apply to MBSFN 1.

In a second operation 315, the base station 110 may transmit a second MCCH communication (MCCH 2) of the second MBSFN on an MCCH subframe indicated in the SIB. In FIG. 3, this MCCH subframe is shown as SF #6 on SFN 4 (or frame 4). The UE 120 may receive and decode the second MCCH communication. The second MCCH communication may include a second configuration for an MTCH or for MSI. The MTCH may carry multicast or broadcast data for MBSFN 2, and the MSI may include MAC layer scheduling information associated with the MTCH on MBSFN 2. The second MTCH/MSI configuration may indicate, for example, subframes allocated to the MTCH on the PMCH for MBSFN 2 or subframes allocated to MSI on the PMCH for MBSFN 2. The second MTCH/MSI communication may apply to MBSFN 2. An MCCH configuration, an MTCH configuration, or an MSI configuration may be different for different MBSFNs.

In some aspects, the MCCH, the MTCH, and MSI are all carried in the PMCH. PMCH subframes may have a different design, numerology, sub-carrier spacing, or symbol duration than legacy LTE subframes. As used herein, the term PMCH subframe may refer to a time domain PMCH entity used for the PMCH. In some aspects, a PMCH symbol may be 1 millisecond in duration, and there may be 1 PMCH symbol per subframe, with a radio frame duration of 10 milliseconds. Alternatively, a PMCH subframe may include a 3 millisecond PMCH symbol duration. In such examples, a radio frame may be 40 milliseconds in duration, and may include 13 PMCH subframes (each with a duration of 3 milliseconds) and a cell acquisition subframe (CAS) with a duration of 1 millisecond. Although this disclosure uses the term "subframe" as an example time domain resource, the techniques described herein can be applied to other types of time domain resources, such as slots, mini-slots, or symbols, among other examples. Thus, the term "subframe," when used herein, may be replaced with the term "time domain resource," "slot," "mini-slot," or "symbol."

Figure 4:
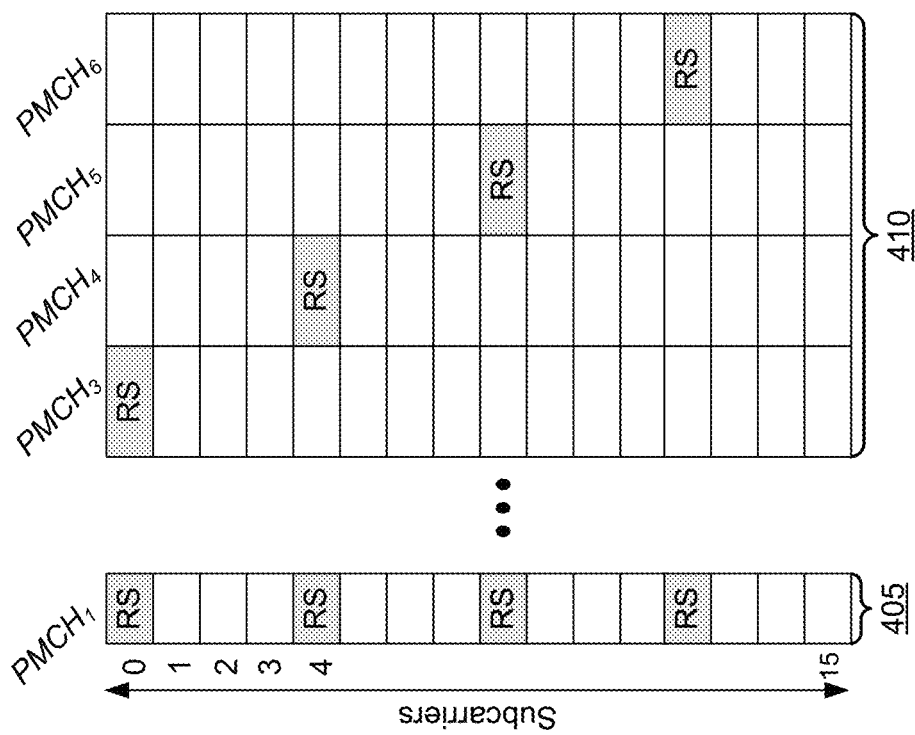
FIG. 4 is a diagram illustrating an example of different reference signal patterns in accordance with various aspects of the present disclosure.

FIG. 4 is a diagram illustrating an example of different reference signal patterns in accordance with various aspects of the present disclosure.

To decode a PMCH subframe (or PMCH symbol), the UE 120 may perform channel estimation using reference signals associated with the PMCH. These reference signals may be referred to as MBSFN reference signals. In some cases, a PMCH subframe may be associated with a first reference signal (RS) pattern 405 that is denser in the frequency domain as compared to a second RS pattern 410. The first RS pattern 405 (a first RS frequency domain pattern) may enable the UE 120 to perform channel estimation for a PMCH subframe configured with the first RS pattern 405 (shown as $PMCH_1$) without requiring the UE 120 to obtain any reference signals from other PMCH subframes. In such examples, the PMCH subframe configured with the first RS pattern 405 may be referred to as a self-decodable PMCH subframe.

When the second RS pattern 410 (a second RS frequency domain pattern) is used, the UE 120 may need to obtain reference signals from a group of PMCH subframes to perform channel estimation and decoding for a particular PMCH subframe included in the group of PMCH subframes. Referring to FIG. 4, the UE 120 may need to obtain reference signals from a group of PMCH subframes shown as $PMCH_3$, $PMCH_4$, $PMCH_5$, and $PMCH_6$ to perform channel estimation and decoding for a single PMCH subframe included in the group. Using the second RS pattern 410 reduces reference signal overhead as compared to the first RS pattern 405.

When a base station 110 is associated with a single MBSFN, the second RS pattern 410 may reduce signaling overhead while avoiding long delays in decoding, buffering of reference signals, and the like. However, when a base station 110 is associated with multiple MBSFNs, those MBSFNs may be carried on different physical channels (having different channel characteristics, different numerologies, among other examples) and may be time-division multiplexed, as described above in connection with FIG. 3. In such examples, MBSFN reference signals from a first MBSFN may not be used to perform channel estimation for a second MBSFN due to the different physical channels. Furthermore, due to time-division multiplexing, a PMCH subframe of a first MBSFN may not be immediately preceded by a PMCH subframe from the same MBSFN subframe. In such examples, if the second RS pattern 410 is used, the UE 120 may need to buffer reference signals, leading to excessive memory usage and increased latency. If the PMCH subframe is an MCCH subframe, this may cause additional delay and memory usage because the UE 120 may need to wait to decode MTCH subframes configured by the MCCH or may need to buffer multiple MTCH subframes until the MCCH is decoded. Similarly, buffering requirements and delays may apply when the PMCH subframe is an MSI subframe or an MTCH subframe that is not preceded by another subframe from the same MBSFN.

Some techniques and apparatuses described herein enable indication of different frequency domain RS patterns for different PMCH subframes. For example, the base station 110 may indicate different frequency domain RS patterns for an MCCH in a SIB, may indicate different frequency domain RS patterns for an MTCH or for MSI in an MCCH communication, among other examples. Using the indication, RS patterns may be designed to reduce the latency and buffering delays described above.

The RS patterns shown in FIG. 4 are provided as examples. In some aspects, different RS patterns may be used. For example, the RS patterns are shown as having a reference signal on every fourth subcarrier (within a PMCH subframe for the first RS pattern 405 and across the group of PMCH subframes for the second RS pattern 410). In some aspects, the RS patterns may have a reference signal on every second subcarrier, every third subcarrier, every fifth subcarrier, among other examples.

Figure 5:
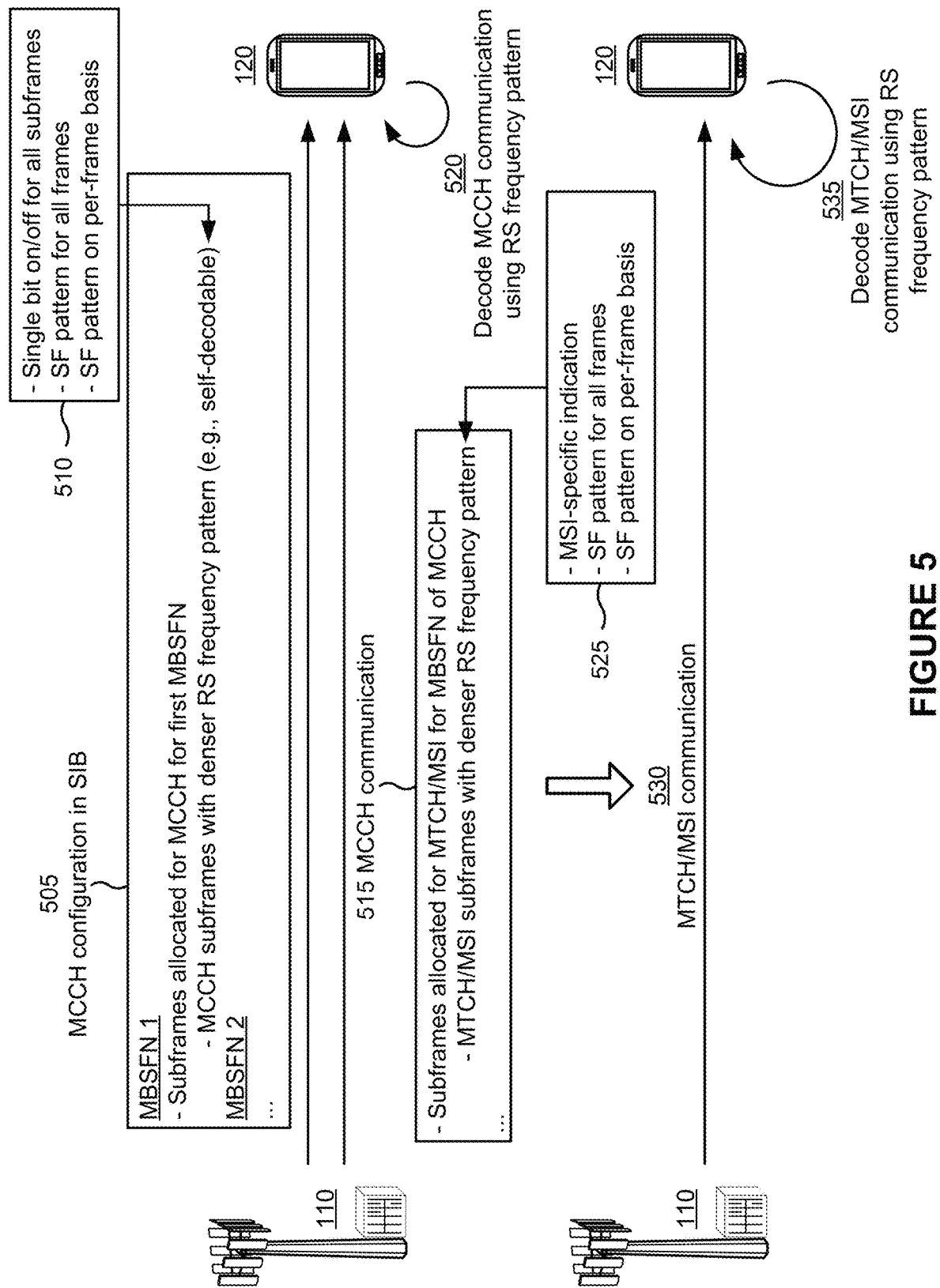
FIG. 5 is a diagram illustrating an example of decoding physical multicast channel subframes according to different reference signal patterns in accordance with various aspects of the present disclosure.

FIG. 5 is a diagram illustrating an example of decoding physical multicast channel subframes according to different reference signal patterns in accordance with various aspects of the present disclosure.

As shown in FIG. 5, a base station 110 and a UE 120 may communicate with one another. In a first operation 505, the base station 110 may transmit, to the UE 120, an MCCH configuration that indicates a set of MCCH subframes (or generally a set of MCCH time domain resources, such as a set of MCCH slots) allocated to the MCCH for an MBSFN area. The base station 110 may transmit the MCCH configuration in a SIB. In some aspects, when the base station 110 belongs to multiple MBSFN areas, the SIB may include multiple MCCH configurations, with one MCCH configuration per MBSFN area. In some aspects, the MCCH configuration may be indicated in a field of the SIB (for example, an mcch-Config field), which may be included in an MBSFN area information (for example, MBSFN-AreaInfo-r9) information element of the SIB. In some aspects, the set of MCCH subframes allocated for an MBSFN area may be indicated by an MCCH repetition period field (for example, mcch-RepetitionPeriod), a radio frame allocation offset field (for example, radioFrameAllocationOffset), and a subframe allocation information field (for example, sf-allocInfo).

As further shown, the MCCH configuration may include an indication 510 of a first set of MCCH subframes that have a first RS pattern (for example, the first RS pattern 405 of FIG. 4). Additionally or alternatively, the MCCH configuration may include an indication 510 of a second set of MCCH subframes that have a second RS pattern (for example, the second RS pattern 410 of FIG. 4). The first RS pattern may differ in frequency domain density as compared to the second RS pattern. For example, the first RS pattern may be denser in the frequency domain as compared to the second RS pattern, as described above in connection with FIG. 4. In some aspects, the indication 510 may be included within the MCCH configuration field (mcch-Config), which may be included in the MBSFN area information (MBSFN-AreaInfo-r9) information element of the SIB.

In some aspects, the first RS pattern may enable self-decoding of a subframe in which the first RS pattern is included. For example, when the first RS pattern is applied to a subframe, that subframe may be self-decodable. In such examples, the UE 120 may decode the self-decodable subframe based at least in part on performing channel estimation for the subframe using a set of reference signals included in the subframe and without requiring or using a reference signal from any other subframe.

In some aspects, the second RS pattern does not enable self-decoding of a subframe in which the second RS pattern is included. For example, when the second RS pattern is applied to a subframe, that subframe may not be self-decodable. In such examples, the UE 120 may decode the non-self-decodable subframe based at least in part on performing channel estimation for the subframe using a set of reference signals included in multiple subframes, such as a PMCH group that includes the subframe.

In some aspects, the first set of MCCH subframes may have a denser RS pattern than a second set of MCCH subframes. The first set of MCCH subframes may be included in the set of MCCH subframes allocated to the MCCH for the MBSFN area. In some aspects, the second set of MCCH subframes may also be included in the set of MCCH subframes allocated to the MCCH for the MBSFN area. In such examples, different MCCH subframes allocated for the MBSFN area may have different RS patterns. In some aspects, the second set of MCCH subframes may be included in a different MBSFN area than the first set of MCCH subframes. In such examples, all MCCH subframes in the MBSFN area may have the same RS pattern.

As further shown, in some aspects, the indication 510 may include a single bit that indicates whether all MCCH subframes, of the set of MCCH subframes allocated for an MBSFN area, have the first RS pattern. If the bit is set to a first value (for example, 1) for an MBSFN area, then this may indicate that all MCCH subframes of the MBSFN have the first RS pattern. If the bit is set to a second value (for example, 0) for an MBSFN area, then this may indicate that all MCCH subframes of the MBSFN area have the second RS pattern (or do not have the first RS pattern). Additionally or alternatively, the second value may indicate that all MCCH subframes of the MBSFN area are preceded by one or more subframes of the same MBSFN area, which enables decoding of a non-self-decodable MCCH subframe.

Alternatively, the indication 510 may include a bitmap with a set of bits. In such examples, each bit of the set of bits may correspond to a different MCCH subframe (or a different PMCH subframe, which may include MCCH subframes, MTCH subframes, or MSI subframes). If a bit in the bitmap is set to a first value (for example, 1), then this may indicate that a corresponding MCCH subframe (an MCCH subframe corresponding to or represented by the bit) has the first RS pattern. If the bit is set to a second value (for example, 0), then this may indicate that a corresponding MCCH subframe has the second RS pattern (or does not have the first RS pattern). Additionally or alternatively, the second value of the bit may indicate that a corresponding MCCH subframe is preceded by one or more subframes of the same MBSFN area, which enables decoding of the corresponding MCCH subframe (which may non-self-decodable).

In some aspects, the indication 510 may include a single bitmap that applies to all frames of the MBSFN area. Alternatively, the indication 510 may indicate one or more frames of the MBSFN area to which the bitmap applies. In some aspects, the indication 510 may include multiple bitmaps. In such examples, the indication 510 may indicate a first set of frames to which a first bitmap is to be applied, a second set of frames to which a second bitmap is to be applied, and so on. In some aspects, the indication 510 may exclude one or more frames from being mapped to a bitmap. In such examples, the one or more frames that are not mapped to any bitmap may not include any subframes for which the first RS pattern is applied. In some aspects, a quantity of bits included in the bitmap may be equal to the quantity of PMCH subframes included in a radio frame (for example, 10 subframes, 13 subframes, among other examples). To conserve overhead, in some aspects, the bitmap may exclude a bit corresponding to the CAS.

In a second operation 515, the base station may transmit, to the UE 120, an MCCH communication (for example, a communication on the MCCH). The base station 110 may transmit the MCCH communication in an MCCH subframe allocated to the MCCH in a corresponding MBSFN area, as indicated in the MCCH configuration. The base station 110 may transmit an MCCH communication using an RS pattern corresponding to an MCCH subframe in which the MCCH communication is transmitted. For example, if the MCCH configuration indicates that a first set of MCCH subframes uses the first RS pattern, and the base station 110 transmits an MCCH communication in an MCCH subframe of the first set of MCCH subframes, then the base station 110 may transmit the MCCH communication using the first RS pattern. If the base station 110 transmits an MCCH communication in an MCCH subframe that is not included in the first set of MCCH subframes, then the base station 110 may transmit the MCCH communication using an RS pattern that is different from the first RS pattern.

In a third operation 520, the UE 120 may decode the MCCH communication according to the indicated RS pattern corresponding to that MCCH communication. For example, if the UE 120 receives the MCCH communication in an MCCH subframe indicated as having the first RS pattern, then the UE 120 may perform channel estimation using the first RS pattern. Alternatively, if the UE 120 receives an MCCH communication in an MCCH subframe indicated as having the second RS pattern (or as not having the first RS pattern), then the UE 120 may perform channel estimation using the second RS pattern. As described above, the quantity of subframes from which the UE 120 obtains reference signals for performing channel estimation and decoding of a subframe may depend on the RS pattern indicated for that subframe. In the case of a self-decodable subframe, the UE 120 may perform channel estimation using only reference signals from that self-decodable subframe and not from any other subframes. In the case of a non-self-decodable subframe, the UE 120 may perform channel estimation using reference signals from multiple subframes (which may include the non-self-decodable subframe).

As shown, the MCCH communication may include an MTCH configuration that indicates a set of MTCH subframes (or generally a set of MTCH time domain resources, such as a set of MTCH slots) allocated to the MTCH for the same MBSFN area of the MCCH communication. Additionally or alternatively, the MCCH communication may include an MSI configuration that indicates a set of MSI subframes for the same MBSFN area of the MCCH communication. Thus, the base station 110 may transmit the MTCH configuration and/or the MSI configuration (referred to collectively as an MTCH/MSI configuration) in an MCCH communication. In some aspects, when the base station 110 belongs to multiple MBSFN areas, MCCH communications for different MBSFN areas may include different MTCH/MSI configurations, with one MTCH/MSI configuration per MBSFN area. In some aspects, the MTCH/MSI configuration may be indicated in a subframe configuration information element of the MCCH communication (for example, an MBSFN-Subframe-Config information element). For example, the MTCH/MSI subframes may be indicated by a radio frame allocation period field (for example, radioFrameAllocationPeriod), a radio frame allocation offset field (for example, radioFrameAllocationOffset), and a subframe allocation field (for example, subframeAllocation).

In a similar manner as described above, the MTCH/MSI configuration may include an indication 525 of a first set of MTCH and/or MSI (MTCH/MSI) subframes that have a first RS pattern (for example, the first RS pattern 405 of FIG. 4). Additionally or alternatively, the MTCH/MSI configuration may include an indication 525 of a second set of MTCH/MSI subframes that have a second RS pattern (for example, the second RS pattern 410 of FIG. 4). The first RS pattern may differ in frequency domain density as compared to the second RS pattern. For example, the first RS pattern may be denser in the frequency domain as compared to the second RS pattern, as described above in connection with FIG. 4. In some aspects, the indication 525 may be included within the subframe configuration information element (MBSFN-Subframe-Config) of the MCCH communication.

As described above, in some aspects, the first RS pattern may enable self-decoding of a subframe in which the first RS pattern is included. For example, when the first RS pattern is applied to a subframe, that subframe may be self-decodable. In such examples, the UE 120 may decode the self-decodable subframe based at least in part on performing channel estimation for the subframe using a set of reference signals included in the subframe and without requiring or using a reference signal from any other subframe. In some aspects, the second RS pattern does not enable self-decoding of a subframe in which the second RS pattern is included. For example, when the second RS pattern is applied to a subframe, that subframe may not be self-decodable. In such examples, the UE 120 may decode the non-self-decodable subframe based at least in part on performing channel estimation for the subframe using a set of reference signals included in multiple subframes, such as a PMCH group that includes the subframe.

In some aspects, the first set of MTCH/MSI subframes may have a denser RS pattern than a second set of MTCH/MSI subframes. The first set of MTCH/MSI subframes may be included in the set of MTCH/MSI subframes allocated to the MTCH/MSI for the MBSFN area. In some aspects, the second set of MTCH/MSI subframes may also be included in the set of MTCH/MSI subframes allocated to the MTCH/MSI for the MBSFN area. In such examples, different MTCH/MSI subframes allocated for the MBSFN area may have different RS patterns. In some aspects, the second set of MTCH/MSI subframes may be included in a different MBSFN area than the first set of MTCH/MSI subframes. In such examples, all MTCH/MSI subframes in the MBSFN area may have the same RS pattern.

As further shown, in some aspects, the indication 525 may be only for MSI subframes, and not for MTCH subframes. For example, the indication 525 may indicate one or more MSI subframes, of the set of MSI subframes allocated for an MBSFN area, that have the first RS pattern. In some aspects, the indication 525 may be a single bit indication for all MSI subframes in the MBSFN area, in a similar manner as described above. Alternatively, the indication 525 may include a bitmap, where each bit of the bitmap corresponds to a different MSI subframe. A first value of a bit may indicate that a corresponding MSI subframe has (or all MSI subframes of the MBSFN area have) the first RS pattern. A second value of the bit may indicate that a corresponding MSI subframe has (or all MSI subframes of the MBSFN area have) the second RS pattern (or does/do not have the first RS pattern). Additionally or alternatively, the second value may indicate that a corresponding MSI subframe (or all MSI subframes of the MBSFN area) is preceded by one or more subframes of the same MBSFN area, which enables decoding of a non-self-decodable MSI subframe.

In some aspects, the indication 525 may include a bitmap with a set of bits. In such examples, each bit of the set of bits may correspond to a different MTCH/MSI subframe (or a different PMCH subframe, which may include MCCH subframes, MTCH subframes, or MSI subframes). If a bit in the bitmap is set to a first value (for example, 1), then this may indicate that a corresponding MTCH/MSI subframe (an MTCH/MSI subframe corresponding to or represented by the bit) has the first RS pattern. If the bit is set to a second value (for example, 0), then this may indicate that a corresponding MTCH/MSI subframe has the second RS pattern (or does not have the first RS pattern). Additionally or alternatively, the second value of the bit may indicate that a corresponding MTCH/MSI subframe is preceded by one or more subframes of the same MBSFN area, which enables decoding of the corresponding MTCH/MSI subframe (which may non-self-decodable).

In some aspects, the indication 525 may include a single bitmap that applies to all frames of the MBSFN area. Alternatively, the indication 525 may indicate one or more frames of the MBSFN area to which the bitmap applies. In some aspects, the indication 525 may include multiple bitmaps. In such examples, the indication 510 may indicate a first set of frames to which a first bitmap is to be applied, a second set of frames to which a second bitmap is to be applied, and so on. In some aspects, the indication 525 may exclude one or more frames from being mapped to a bitmap. In such examples, the one or more frames that are not mapped to any bitmap may not include any subframes for which the first RS pattern is applied. In some aspects, a quantity (e.g., a number) of bits included in the bitmap may be equal to the quantity of PMCH subframes included in a radio frame (for example, 10 subframes, 13 subframes, among other examples). To conserve overhead, in some aspects, the bitmap may exclude a bit corresponding to the CAS.

In a fourth operation 530, the base station may transmit, to the UE 120, an MTCH/MSI communication (for example, a communication on the MTCH or a channel that carries the MSI). The base station 110 may transmit the MTCH/MSI communication in an MTCH/MSI subframe allocated to the MTCH/MSI in a corresponding MBSFN area, as indicated in the MTCH/MSI configuration. The base station 110 may transmit an MTCH/MSI communication using an RS pattern corresponding to an MTCH/MSI subframe in which the MTCH/MSI communication is transmitted. For example, if the MTCH/MSI configuration indicates that a first set of MTCH/MSI subframes uses the first RS pattern, and the base station 110 transmits an MTCH/MSI communication in an MTCH/MSI subframe of the first set of MTCH/MSI subframes, then the base station 110 may transmit the MTCH/MSI communication using the first RS pattern. If the base station 110 transmits an MTCH/MSI communication in an MTCH/MSI subframe that is not included in the first set of MTCH/MSI subframes, then the base station 110 may transmit the MTCH/MSI communication using an RS pattern that is different from the first RS pattern.

In a fifth operation 535, the UE 120 may decode the MTCH/MSI communication according to the indicated RS pattern corresponding to that MTCH/MSI communication. For example, if the UE 120 receives the MTCH/MSI communication in an MTCH/MSI subframe indicated as having the first RS pattern, then the UE 120 may perform channel estimation using the first RS pattern. Alternatively, if the UE 120 receives an MTCH/MSI communication in an MTCH/MSI subframe indicated as having the second RS pattern (or as not having the first RS pattern), then the UE 120 may perform channel estimation using the second RS pattern. As described above, the quantity of subframes from which the UE 120 obtains reference signals for performing channel estimation and decoding of a subframe may depend on the RS pattern indicated for that subframe. In the case of a self-decodable subframe, the UE 120 may perform channel estimation using only reference signals from that self-decodable subframe and not from any other subframes. In the case of a non-self-decodable subframe, the UE 120 may perform channel estimation using reference signals from multiple subframes (which may include the non-self-decodable subframe).

Although both the MCCH and the MTCH/MSI are described herein as using a first RS pattern or a second RS pattern, in some aspects, the MCCH may use a different RS pattern (or a different set of RS patterns) than the MTCH/MSI. For example, the MCCH may use a first RS pattern and a second RS pattern (with the first RS pattern being denser in the frequency domain than the second RS pattern), and the MTCH/MSI may use a third RS pattern and a fourth RS pattern (with the third RS pattern being denser in the frequency domain than the fourth RS pattern). In some aspects, the MCCH and the MTCH/MSI may have one or more RS patterns in common and one or more different RS patterns. By indicating different frequency domain RS patterns for different PMCH subframes, RS patterns may be designed to reduce latency and buffering delays.

FIG. 6 is a diagram illustrating an example of decoding physical multicast channel subframes according to different reference signal patterns in accordance with various aspects of the present disclosure.

As shown in FIG. 6, an indication 605 of MCCH subframes having a first RS pattern may be included in an MCCH configuration (mcch-Config) of a SIB for a first MBSFN area. The indication 605 is shown as a bitmap with a value of 1000000, which indicates that an MCCH communication in subframe 1 is self-decodable, and that MCCH communications in subframes 2 through 4, and 10 through 13, are not self-decodable in the first MBSFN area. Although the first RS pattern is described in connection with FIG. 6 as enabling self-decoding, another RS pattern may be used.

As further shown, an indication 610 of MTCH/MSI subframes having a first RS pattern may be included in an MTCH/MSI configuration (MBSFN-Subframe-Config) of an MCCH communication of a first MBSFN area. The indication 610 is shown as a bitmap with a value of 1000000001000, which indicates that MTCH/MSI communications in subframe 1 and subframe 10 are self-decodable, and that MTCH/MSI communications in subframes 2 through 9, and 11 through 13, are not self-decodable.

As shown in FIG. 6, an indication 615 of MCCH subframes having a first RS pattern may be included in an MCCH configuration (mcch-Config) of a SIB for a second MBSFN area. The indication 615 is shown as a bitmap with a value of 000100, which indicates that an MCCH communication in subframe 6 is self-decodable, and that MCCH communications in subframes 5 and 7 through 9 are not self-decodable in the second MBSFN area.

As further shown, an indication 620 of MTCH/MSI subframes having a first RS pattern may be included in an MTCH/MSI configuration (MBSFN-Subframe-Config) of an MCCH communication of a second MBSFN area. The indication 620 is shown as a bitmap with a value of 0000100000000, which indicates that an MTCH/MSI communications in subframe 5 is self-decodable, and that MTCH/MSI communications in subframes 2 through 4 and 6 through 13 are not self-decodable.

Using the RS pattern configuration of FIG. 6, the earliest-occurring subframes in which MCCH communications occur within an MBSFN area (for example, subframes 1 and 6) are configured with the first RS pattern, such as a self-decodable RS pattern. Similarly, the earliest-occurring subframes in which MTCH/MSI communications occur within an MBSFN area (for example, subframes 1, 5, and 10) are configured with the first RS pattern, such as a self-decodable RS pattern. In this way, every subframe can be decoded because subframes with insufficient preceding subframes are self-decodable, which also enables subsequence subframes to be decoded.

Figure 7:
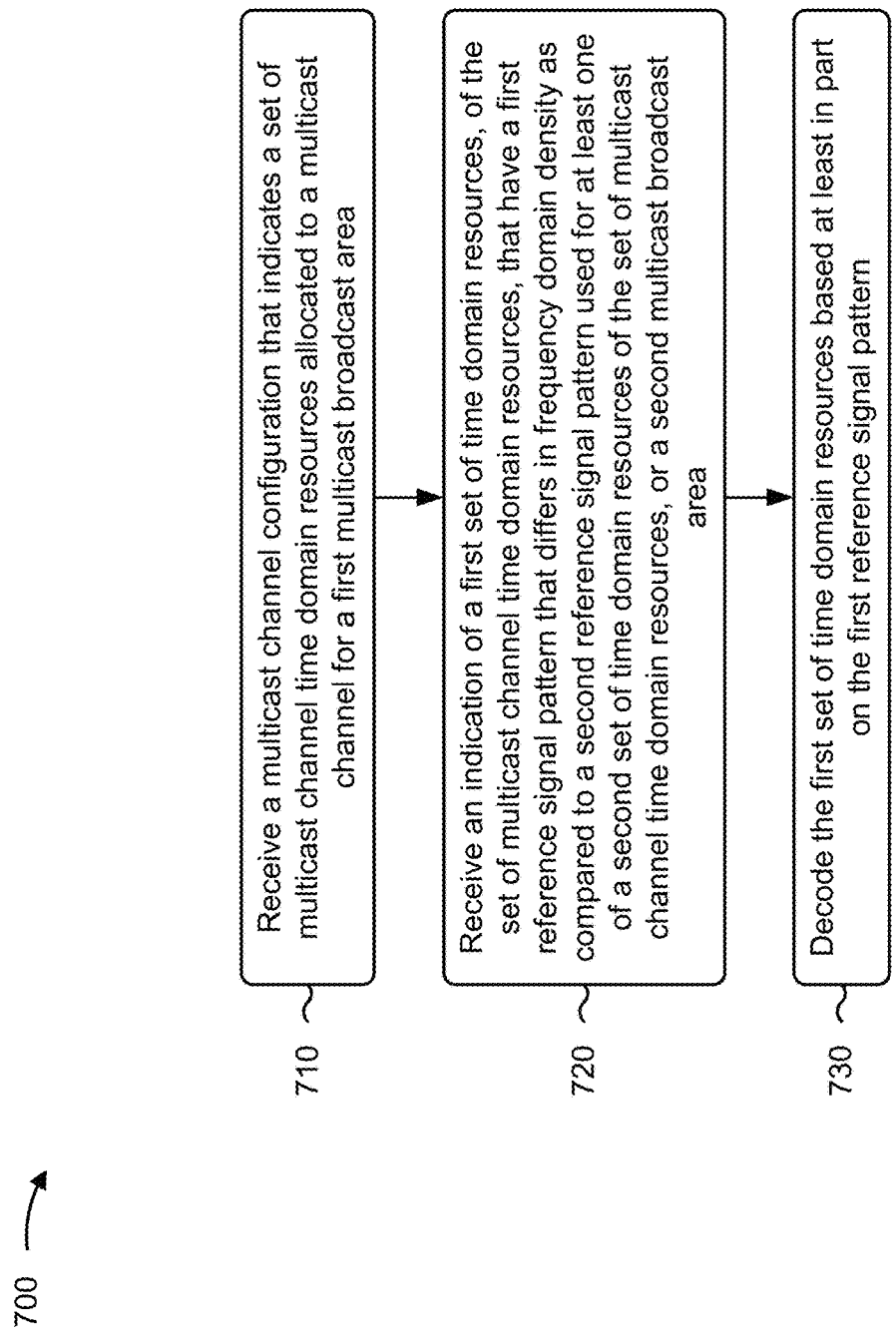
FIG. 7 is a diagram illustrating an example process performed by a UE in accordance with various aspects of the present disclosure.

FIG. 7 is a flowchart illustrating an example process 700 performed, for example, by a user equipment (UE) in accordance with various aspects of the present disclosure. Example process 700 is an example where the UE (for example, UE 120) performs operations associated with decoding physical multicast channel time domain resources according to different reference signal patterns.

As shown in FIG. 7, in some aspects, process 700 may include receiving a multicast channel configuration that indicates a set of multicast channel time domain resources allocated to a multicast channel for a first multicast broadcast area (block 710). For example, the UE (such as by using reception component 802, depicted in FIG. 8) may receive a multicast channel configuration that indicates a set of multicast channel time domain resources allocated to a multicast channel for a first multicast broadcast area, as described above.

As further shown in FIG. 7, in some aspects, process 700 may include receiving an indication of a first set of time domain resources, of the set of multicast channel time domain resources, that have a first reference signal pattern that differs in frequency domain density as compared to a second reference signal pattern used for at least one of: a second set of time domain resources of the set of multicast channel time domain resources, or a second multicast broadcast area (block 720). For example, the UE (such as by using reception component 802, depicted in FIG. 8) may receive an indication of a first set of time domain resources, of the set of multicast channel time domain resources, that have a first reference signal pattern that differs in frequency domain density as compared to a second reference signal pattern used for at least one of: a second set of time domain resources of the set of multicast channel time domain resources, or a second multicast broadcast area, as described above.

As further shown in FIG. 7, in some aspects, process 700 may include decoding the first set of time domain resources based at least in part on the first reference signal pattern (block 730). For example, the UE (such as by using communication manager 804 or decoding component 810, depicted in FIG. 8) may decode the first set of time domain resources based at least in part on the first reference signal pattern, as described above.

Process 700 may include additional aspects, such as any single aspect or any combination of aspects described below or in connection with one or more other processes described elsewhere herein.

In a first additional aspect, the multicast channel is a multicast control channel and the indication is transmitted in a system information block.

In a second additional aspect, alone or in combination with the first aspect, the multicast channel is a multicast traffic channel or a channel carrying multicast scheduling information for the multicast traffic channel, and the indication is transmitted in a multicast control channel communication.

In a third additional aspect, alone or in combination with one or more of the first and second aspects, the first reference signal pattern is denser in a frequency domain as compared to the second reference signal pattern.

In a fourth additional aspect, alone or in combination with one or more of the first through third aspects, the indication indicates that the first set of time domain resources are self-decodable.

In a fifth additional aspect, alone or in combination with one or more of the first through fourth aspects, the indication indicates that channel estimation for each time domain resource, of the first set of time domain resources, does not use a reference signal from any other time domain resource.

In a sixth additional aspect, alone or in combination with one or more of the first through fifth aspects, the indication includes a bitmap with a set of bits corresponding to the set of multicast channel time domain resources, wherein a first value of a bit indicates that a corresponding time domain resource has the first reference signal pattern.

In a seventh additional aspect, alone or in combination with one or more of the first through sixth aspects, a second value of the bit indicates that the corresponding time domain resource is preceded by a time domain resource from a same multicast broadcast area as the corresponding time domain resource.

In an eighth additional aspect, alone or in combination with one or more of the first through seventh aspects, the bitmap applies to all multicast channel frames.

In a ninth additional aspect, alone or in combination with one or more of the first through eighth aspects, the indication further indicates one or more multicast channel frames to which the bitmap applies.

In a tenth additional aspect, alone or in combination with one or more of the first through ninth aspects, the indication includes a single bit that indicates whether all time domain resources, of the set of multicast channel time domain resources, have the first reference signal pattern.

In an eleventh additional aspect, alone or in combination with one or more of the first through tenth aspects, decoding the first set of time domain resources comprises performing channel estimation for a time domain resource, of the first set of time domain resources, using a set of reference signals included in the time domain resource and without requiring a reference signal from any other time domain resource.

In a twelfth additional aspect, alone or in combination with one or more of the first through eleventh aspects, process 700 includes decoding the second set of time domain resources based at least in part on the second reference signal pattern, wherein decoding the second set of time domain resources comprises performing channel estimation for a time domain resource, of the second set of time domain resources, using a set of reference signals included in multiple time domain resources.

In a thirteenth additional aspect, alone or in combination with one or more of the first through twelfth aspects, the multicast channel is a MCCH and the indication is transmitted in a system information block, and further comprising receiving, via the MCCH, a MTCH configuration that indicates a second set of multicast channel time domain resources allocated to an MTCH or for MSI for the multicast broadcast area, receiving, via the MCCH, an indication of a first set of MTCH or MSI time domain resources, of the second set of multicast channel time domain resources, that have a denser frequency domain reference signal pattern than at least one of a second set of MTCH or MSI time domain resources, of the second set of multicast channel time domain resources, or the second multicast broadcast area, and decoding the first set of MTCH or MSI time domain resources based at least in part on the denser reference signal pattern.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
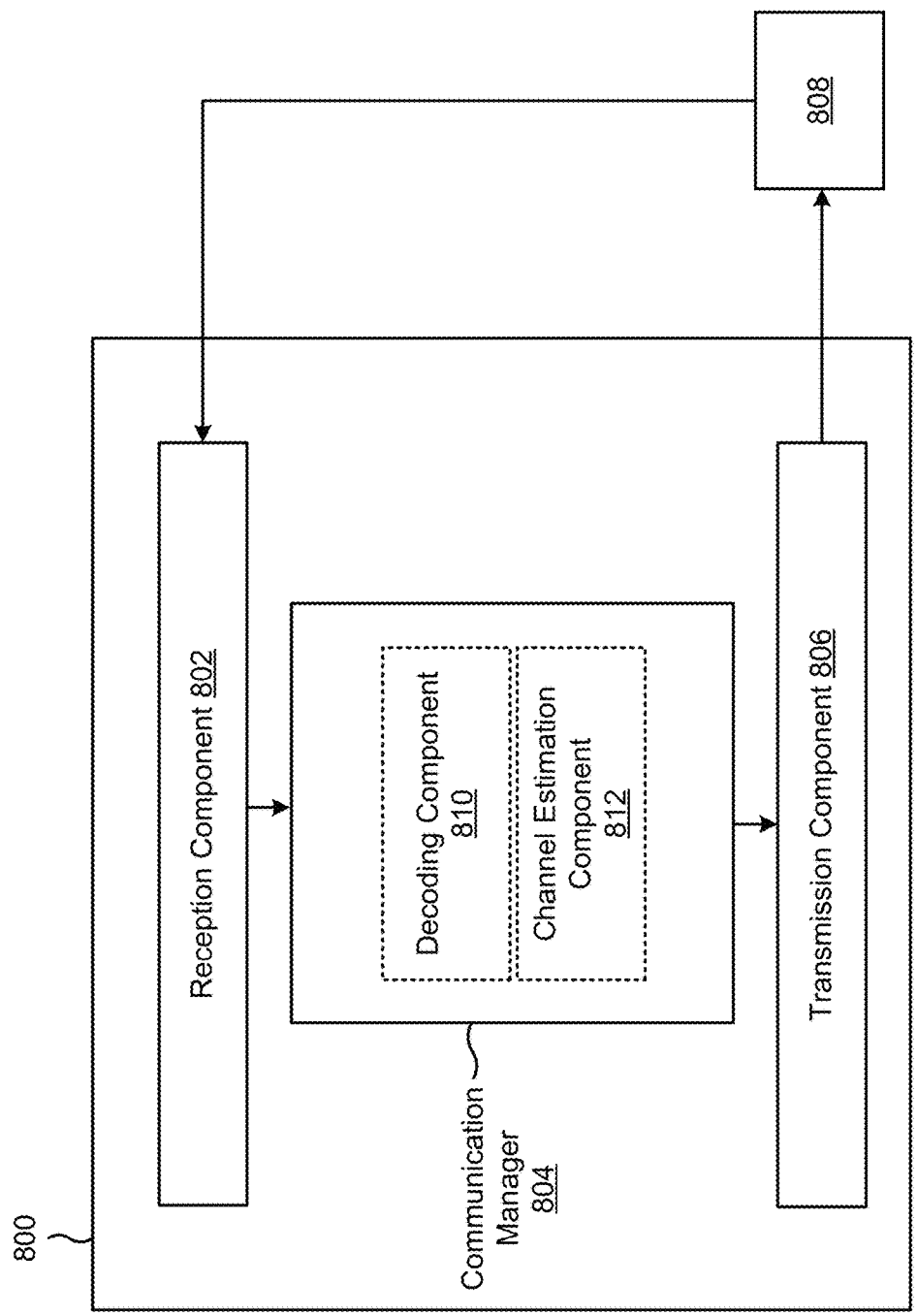
FIG. 8 is a block diagram of an example apparatus for wireless communication in accordance with various aspects of the present disclosure.

FIG. 8 is a block diagram of an example apparatus 800 for wireless communication in accordance with various aspects of the present disclosure. The apparatus 800 may be a UE, or a UE may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein in connection with FIGS. 5-7. Additionally or alternatively, the apparatus 800 may be configured to perform one or more processes described herein, such as process 700 of FIG. 7. In some aspects, the apparatus 800 may include one or more components of the UE described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the UE described above in connection with FIG. 2. In some aspects, the transmission component 806 may be co-located with the reception component 802 in a transceiver.

The communication manager 804 may receive or may cause the reception component 802 to receive a multicast channel configuration that indicates a set of multicast channel time domain resources allocated to a multicast channel for a first multicast broadcast area. The communication manager 804 may receive or may cause the reception component 802 to receive an indication of a first set of time domain resources, of the set of multicast channel time domain resources, that have a first reference signal pattern. The first reference signal pattern may differ in frequency domain density as compared to a second reference signal pattern used for at least one of a second set of time domain resources of the set of multicast channel time domain resources, or a second multicast broadcast area. The communication manager 804 may decode the first set of time domain resources based at least in part on the first reference signal pattern. In some aspects, the communication manager 804 may perform channel estimation for a time domain resource, of the first set of time domain resources, using a set of reference signals included in the time domain resource and without requiring a reference signal from any other time domain resource. In some aspects, the communication manager 804 may include a controller/processor, a memory, or a combination thereof, of the UE described above in connection with FIG. 2.

In some aspects, the communication manager 804 may include a set of components, such as a decoding component 810, a channel estimation component 812, or a combination thereof. Alternatively, the set of components may be separate and distinct from the communication manager 804. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive a multicast channel configuration that indicates a set of multicast channel time domain resources allocated to a multicast channel for a first multicast broadcast area. The reception component 802 may receive an indication of a first set of time domain resources, of the set of multicast channel time domain resources, that have a first reference signal pattern. The first reference signal pattern may differ in frequency domain density as compared to a second reference signal pattern used for at least one of a second set of time domain resources of the set of multicast channel time domain resources, or a second multicast broadcast area. The decoding component 810 may decode the first set of time domain resources based at least in part on the first reference signal pattern.

In some aspects, the channel estimation component 812 may perform channel estimation for a time domain resource, of the first set of time domain resources, using a set of reference signals included in the time domain resource and without requiring a reference signal from any other time domain resource. In some aspects, the decoding component 810 may decode the second set of time domain resources based at least in part on the second reference signal pattern. In some aspects, the channel estimation component 812 may perform channel estimation for a time domain resource, of the second set of time domain resources, using a set of reference signals included in multiple time domain resources.

In some aspects, the reception component 802 may receive, via the MCCH, an MTCH configuration that indicates a second set of multicast channel time domain resources allocated to an MTCH or for MSI for the multicast broadcast area. The reception component 802 may receive, via the MCCH, an indication of a first set of MTCH or MSI time domain resources, of the second set of multicast channel time domain resources, that have a denser frequency domain reference signal pattern than at least one of a second set of MTCH or MSI time domain resources, of the second set of multicast channel time domain resources, or the second multicast broadcast area. The decoding component 810 may decode the first set of MTCH or MSI time domain resources based at least in part on the denser reference signal pattern.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving multicast channel configuration information indicating a first set of multicast channel subframes allocated to a multicast channel for a first multicast broadcast area and a second set of multicast channel subframes associated with a second multicast broadcast area;
   receiving a system information block that includes one or more bits indicating that the first set of multicast channel subframes have a first reference signal pattern that has a different frequency domain density than a second reference signal pattern used for the second set of multicast channel subframes; and
   decoding the first set of multicast channel subframes using the first reference signal pattern based at least in part on the one or more bits.

2. The method of claim 1, wherein the multicast channel is a multicast control channel.

3. The method of claim 1, wherein the multicast channel is a multicast traffic channel or a channel carrying multicast scheduling information for the multicast traffic channel.

4. The method of claim 1, wherein the first reference signal pattern is denser in a frequency domain as compared to the second reference signal pattern.

5. The method of claim 1, wherein the first set of multicast channel subframes are self-decodable based at least in part on the first reference signal pattern.

6. The method of claim 1, wherein channel estimation for each time domain resource, of the first set of multicast channel subframes, does not use a reference signal from any other subframe.

7. The method of claim 1, wherein the one or more bits is a bitmap with a set of bits corresponding to the first set of multicast channel subframes, wherein a first value of a bit indicates that a corresponding subframe has the first reference signal pattern.

8. The method of claim 7, wherein a second value of the bit indicates that the corresponding subframe is preceded by a subframe from a same multicast broadcast area as the corresponding subframe.

9. The method of claim 7, wherein the bitmap applies to all multicast channel frames.

10. The method of claim 7, wherein the bitmap indicates one or more multicast channel frames to which the bitmap applies.

11. The method of claim 1, wherein the one or more bits is a single bit that indicates whether all time subframes, of the first set of multicast channel subframes, have the first reference signal pattern.

12. The method of claim 1, wherein decoding the first set of multicast channel subframes comprises performing channel estimation for a subframe, of the first set of multicast channel subframes, using a set of reference signals included in the subframe and without requiring a reference signal from any other subframe.

13. The method of claim 1, further comprising decoding the second set of multicast channel subframes based at least in part on the second reference signal pattern, wherein decoding the second set of multicast channel subframes comprises performing channel estimation for a subframe, of the second set of multicast channel subframes, using a set of reference signals included in multiple subframes.

14. The method of claim 1, wherein the multicast channel is a multicast control channel (MCCH); and
the method further comprises:
receiving, via the MCCH, a multicast traffic channel (MTCH) configuration that indicates a first set of MTCH subframes for the first multicast broadcast area or a multicast scheduling information (MSI) configuration that includes a first set of MSI subframes for the first multicast broadcast area;
receiving, via the MCCH, an indication of at least one of the first set of MTCH subframes or the first set of MSI subframes having a denser frequency domain reference signal pattern than at least one of a second set of MTCH subframes or a second set of MSI subframes associated with the second multicast broadcast area; and
decoding at least one of the first set of MTCH subframes or the first set of MSI subframes based at least in part on the denser frequency domain reference signal pattern.

15. A user equipment (UE) for wireless communication, comprising:
a memory; and
one or more processors coupled with the memory, the one or more processors configured to:
receive multicast channel configuration information indicating a first set of multicast channel subframes allocated to a multicast channel for a first multicast broadcast area and a second set of multicast channel subframes associated with a second multicast broadcast area;
receive a system information block that includes one or more bits that indicate that the first set of multicast channel subframes have a first reference signal pattern that has a different frequency domain density than a second reference signal pattern used for the second set of multicast channel subframes; and
decode the first set of multicast channel subframes using the first reference signal pattern based at least in part on the one or more bits.

16. The UE of claim 15, wherein the multicast channel is a multicast control channel.

17. The UE of claim 15, wherein the multicast channel is a multicast traffic channel or a channel carrying multicast scheduling information for the multicast traffic channel.

18. The UE of claim 15, wherein the first reference signal pattern is denser in a frequency domain as compared to the second reference signal pattern.

19. The UE of claim 15, wherein the first set of multicast channel subframes are self-decodable based at least in part on the first reference signal pattern.

20. The UE of claim 15, wherein channel estimation for each subframe, of the first set of multicast channel subframes, does not use a reference signal from any other subframe.

21. The UE of claim 15, wherein the one or more bits is a bitmap with a set of bits corresponding to the set of first multicast channel subframes, wherein a first value of a bit indicates that a corresponding subframe has the first reference signal pattern.

22. The UE of claim 21, wherein a second value of the bit indicates that the corresponding subframe is preceded by a subframe from a same multicast broadcast area as the corresponding subframe.

23. The UE of claim 21, wherein the bitmap applies to all multicast channel frames.

24. The UE of claim 21, wherein the bitmap indicates one or more multicast channel frames to which the bitmap applies.

25. The UE of claim 15, wherein the one or more bits is a single bit that indicates whether all subframes, of the first set of multicast channel subframes, have the first reference signal pattern.

26. The UE of claim 15, wherein the one or more processors, to decode the first set of multicast channel subframes, are configured to perform channel estimation for a subframe, of the first set of multicast channel subframes, using a set of reference signals included in the subframe and without requiring a reference signal from any other subframe.

27. The UE of claim 15, wherein the one or more processors are further configured to decode the second set of multicast channel subframes based at least in part on the second reference signal pattern, wherein the one or more processors, to decode the second set of multicast channel subframes, are configured to perform channel estimation for a subframe, of the second set of multicast channel subframes, using a set of reference signals included in multiple subframes.

28. The UE of claim 15, wherein the multicast channel is a multicast control channel (MCCH); and
the one or more processors are further configured to:
receive, via the MCCH, a multicast traffic channel (MTCH) configuration that indicates a first set of MTCH subframes for the first multicast broadcast area or a multicast scheduling information (MSI) configuration that includes a first set of MSI subframes for the first multicast broadcast area;

receive, via the MCCH, an indication of at least one of the first set of MTCH subframes or the first set of MSI subframes having a denser frequency domain reference signal pattern than at least one of a second set of MTCH subframes or a second set of MSI subframes associated with the second multicast broadcast area; and decode at least one of the first set of MTCH subframes or the first set of MSI subframes based at least in part on the denser frequency domain reference signal pattern.

29. A non-transitory computer-readable medium storing a set of instructions for wireless communication, the set of instructions comprising:

one or more instructions that, when executed by one or more processors of a user equipment (UE), cause the UE to:

receive multicast channel configuration information indicating a first set of multicast channel subframes allocated to a multicast channel for a first multicast broadcast area and a second set of multicast channel subframes associated with a second multicast broadcast area;

receive a system information block that includes one or more bits that indicate that the first set of multicast channel subframes have a first reference signal pattern that has a different frequency domain density than a second reference signal pattern used for the second set of multicast channel subframes; and decode the first set of multicast channel subframes using the first reference signal pattern based at least in part on the one or more bits.

30. An apparatus for wireless communication, comprising:

means for receiving multicast channel configuration information indicating a first set of multicast channel subframes allocated to a multicast channel for a first multicast broadcast area and a second set of multicast channel subframes associated with a second multicast broadcast area;

means for receiving a system information block that includes one or more bits that indicate that the first set of multicast channel subframes have a first reference signal pattern that has a different frequency domain density than a second reference signal pattern used for the second set of multicast channel subframes; and means for decoding the first set of multicast channel subframes using the first reference signal pattern based at least in part on the one or more bits.

\* \* \* \* \*